United States Patent [19]

Amrhein

[11] Patent Number: 5,078,179
[45] Date of Patent: Jan. 7, 1992

[54] DIRECTIONAL CONTROL VALVE

[75] Inventor: Reinhard Amrhein, Frammersbach, Fed. Rep. of Germany

[73] Assignee: Mannesmann Rexroth GmbH, Lohr, Fed. Rep. of Germany

[21] Appl. No.: 423,575

[22] Filed: Oct. 12, 1989

Related U.S. Application Data

[63] Continuation of Ser. No. 136,993, Dec. 23, 1987, abandoned.

[30] Foreign Application Priority Data

Dec. 23, 1986 [DE] Fed. Rep. of Germany ..... 36442690

[51] Int. Cl.$^5$ .............................. F15B 13/04
[52] U.S. Cl. .................. 137/625.69; 137/625.3; 137/625.66; 137/625.68; 251/324; 251/325
[58] Field of Search ........... 137/625.69, 625.3, 625.68, 137/625.66; 251/324, 325

[56] References Cited

U.S. PATENT DOCUMENTS 3,435,851  4/1969  Olmsted .................. 137/625.48
3,565,115  2/1971  Beckett et al. ............ 137/625.69
3,630,230  12/1971  Stahle ..................... 251/282 X
4,022,425  5/1977  Govzman et al. ......... 137/625.69 X

FOREIGN PATENT DOCUMENTS 2915096  10/1980  Fed. Rep. of Germany .
3436671   4/1986  Fed. Rep. of Germany .
1245477   9/1971  United Kingdom .

Primary Examiner—Gerald A. Michalsky
Attorney, Agent, or Firm—Cushman, Darby & Cushman

[57] ABSTRACT

A valve comprising a valve housing, a bore in said valve housing, annular grooves defining annular channels arranged in said valve housing and adapted to be connected to valve ports arranged in said housing, a control spool reciprocally mounted within said bore so as to connect and separate said valve ports, and land means in at least one of said annular channels so as to block the rotation of said control spool, said land means extending into said at least one channel transversely to the direction of flow of the pressure medium, said land means extending substantially radially into said annular channel.

7 Claims, 4 Drawing Sheets

DIRECTIONAL CONTROL VALVE

This is a continuation of application Ser. No. 07/136,933, filed Dec. 23, 1987, which was abandoned upon the filling hereof.

The invention relates generally to a valve and in particular to a directional control valve. The invention relates specifically to a directional spool valve and in particular to a proportional directional valve.

Directional control valves are already known and specifically directional control valves of the type having a longitudinal spool are widely used. Such valves comprise connecting ports for the pump, the tank and the user. Said ports are arranged sideways or radially offset with respect to the axis of the spool. Therefore, the spool is subjected to a flow of pressure medium coming from one side based on the given flow direction of the flow of pressure medium coming from the pump port. As a consequence, the spool can be rotated due to that flow of pressure medium, particularly hydraulic oil, which comes from the pump. Such a rotation can occur particularly in a situation where the spool is provided at its outer diameter with large areas subject to attack by the pressure medium. This is for instance the case when bores or fine control grooves (grooves which allow for the fine control or fine movement of the spool) are provided in the spool. As a consequence an undesired rotation of the spool can easily be initiated. The rotation causes additional wear of the spool as well as of the housing and therefore a reduced life-time of the valve. Moreover, the rotation of the spool increases the leakage of the valve.

So as to bar the rotation of the spool it is for instance known to arrange pins at the front end of a control spool. Said pins are guided in corresponding recesses of a cover surrounding said spool. Such a mechanical solution to the above mentioned problem leads to higher design cost for the valve and has an unfavorable influence on the function of the valve due to the friction generated by said pins.

It is an object of the present invention to provide a valve having a housing and a spool with means of a simple design such that a rotation of the spool is avoided.

It is another object of the present invention to provide a directional spool valve having a spool and a housing with anti-rotating means for the spool without causing any negative effects on the operation of the valve.

In accordance with the present invention a valve comprising a housing and a spool is provided. Said valve comprises at least one annular channel defined between the valve housing and the spool. At least one land means is provided in said annular channel or space, so as to avoid the rotation of the spool. In accordance with a preferred embodiment of the invention said land is provided only in the annular space which is connected to the pump port. To arrange the land specifically in the annular space which is directly connected with the pump port, is advantageous. Because the flow of fluid (pressure medium) coming from the pump port is primarily responsible for an initiation of a rotation of the spool, a land located right there where the pressure medium enters the valve is highly efficient in blocking the initiation of a rotation of the spool.

In addition, the means for blocking a rotation of the spool can also be arranged within the housing in the area of the tank port inasmuch as here again the flow of fluid will occur in only one direction. It can be advantageous under certain circumstances to provide means for avoiding the rotation also in the area of the annular spaces which are connected to the user ports.

The shape of the land, in particular the land arranged in the ring channel of the pump port, will drastically reduce the rotation of the pressure medium, in particular the hydraulic fluid, so that the rotation of the spool can be avoided.

In accordance with a preferred embodiment the means for avoiding the rotation of the spool, specifically in the form of a land, can already be provided at the time the housing of the valve is manufactured, specifically cast. There is, for all practical purposes, no additional expense if the land means is formed at the time of casting the entire housing. Thus, the advantages achieved with the invention can be obtained at low cost. No problems arise during the casting operation of the valve housing if in the same casting operation the land means are provided.

In accordance with a preferred embodiment of the invention the land extends into the ring channel adjacent the pump port (pump ring channel) at a location which is 180° opposite to the location where the spool is subjected to the pressure medium coming from the pump port bore and impinging onto the spool substantially tangentially.

The valve as improved by the invention causes substantially no additional cost. The land can easily be provided for practically all different types of valve housings. Moreover, the provision of the land does not cause an undesired reduction of the flow resistance of the valve. Additional features, objects and advantages of the invention may be gathered from the claims and the following description of embodiments.

BRIEF DESCRIPTION OF THE DRAWINGS.

For a better understanding of the present invention reference may be made to the accompanying drawings in which.

Figure 1:
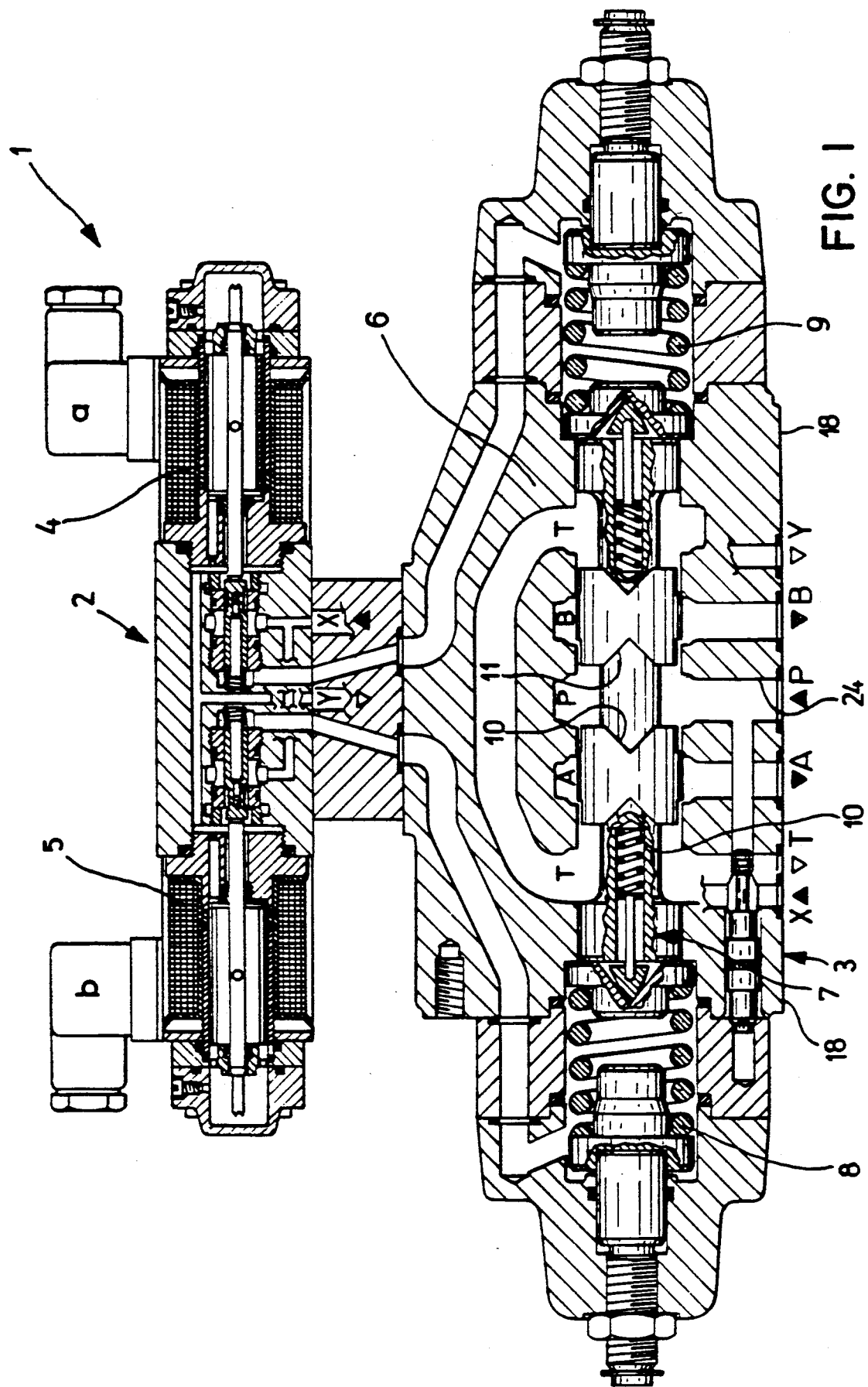
FIG. 1 is a sectional view of a 4 directional proportional valve.

The following description of the invention is made by reference to the 4 directional proportional valve 1 in FIG. 1. However, it should be noted and it should be clear from the description of FIGS. 2-6 that the invention can be used in any other types of valves. The longitudinal bore of the valve shown in FIG. 1 is formed directly in the valve housing 6.

FIGS. 1-4 disclose a first embodiment of a valve of the invention in the form of a so-called 4 directional proportional valve 1. Such a valve is shown for instance at page 143 of the book entitled "The Hydraulic Trainer" published by Rexroth GmbH, 2. issue, 1981.

The 4 directional proportional valve 1 comprises a pilot valve 2 and a main valve 3. The pilot valve 2 is a pressure reducing valve having proportional magnets 4 and 5.

The main valve 3 is a directional valve and comprises in substance a housing 6, a main spool 7 and two centering springs 8 and 9 which hold the main spool 7 in its center position. The main spool 7 is provided with fine control grooves. In FIG. 1 two of said fine control grooves are referred to by reference numerals 10 and 11. The main valve 3 is provided with a connecting surface 18, so as to be placed on the connecting plate of a hydraulic apparatus to be controlled. At the connecting surface 18 the ports are referred to as follows: T is the tank port, A is one of the user ports, P is a pump port, B is another user port and X and Y are control ports. Of particular interest is the pump port P and for that reason the reference numeral 24 is used in FIG. 1 to refer to a pump port bore located in housing 6.

Figure 2:
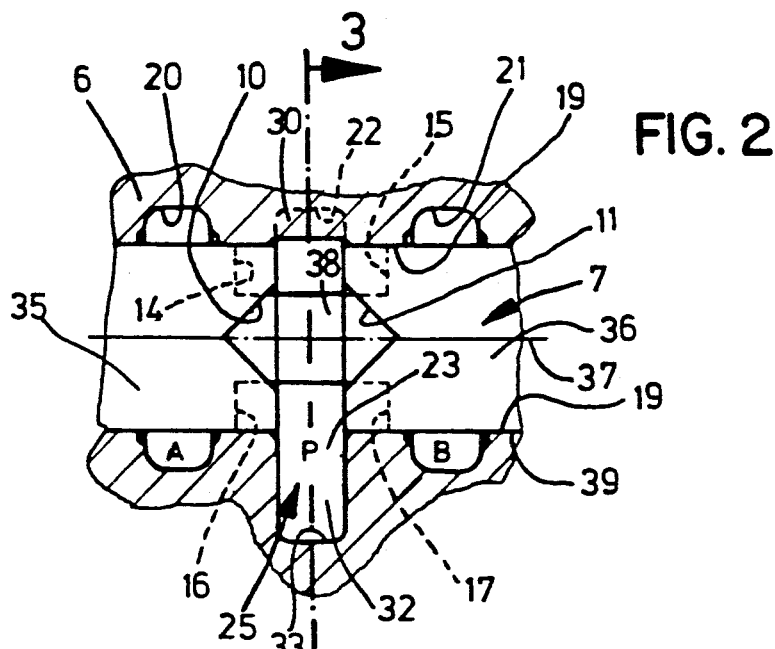
FIG. 2 is an enlarged part of the representation of FIG. 1.
Figure 3:
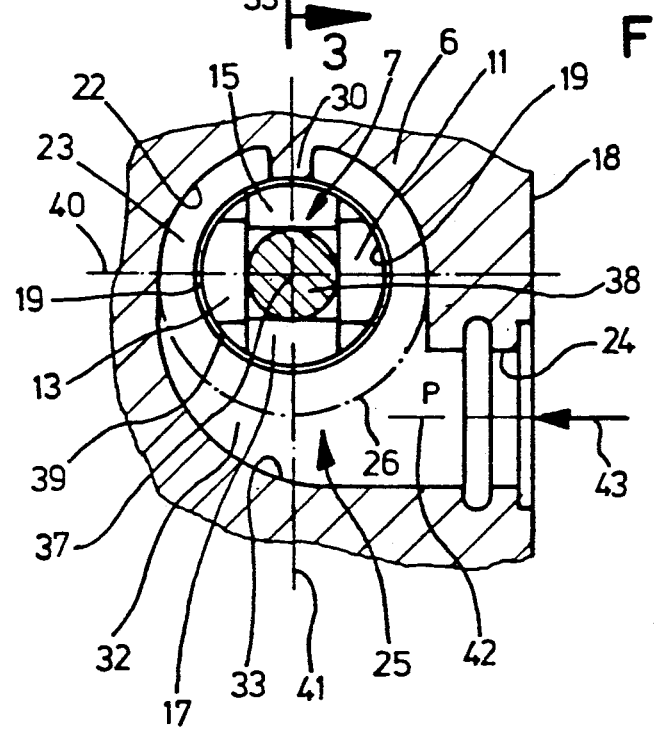
FIG. 3 is a sectional view substantially along line 3—3 in FIG. 2.

FIGS. 2 and 3 show that the spool 7 comprises additional fine control grooves 12 through 17 in the area of the pump port P besides the already mentioned fine control grooves 10 and 11. Also, a longitudinal bore 19 provided in housing 6 and adapted to receive spool 7 is shown. An annular groove 20 is provided for connection to the user port A, an annular groove 21 is provided for the user port B and an annular groove 22 is provided for the pump port P.

In accordance with the present invention the annular groove 22 (or the annular space 23) is provided with means for avoiding or blocking the rotation of the spool 7. Said blocking means is provided in the form of a land 30 which is integrally formed with the housing 6 and is therefore called a housing land 30. Preferable such a land 30 is only located in the annular groove 22 assigned to the pump port P. However, it is also contemplated to provide such a land means 30 particularly also for the ring groove associated with the tank port T. Possibly, the land means could also be provided for the user ports A and B.

The location of the housing land 30 is specifically shown in FIG. 3. It can be recognized that the pressure medium coming from the pump enters housing 6 with a flow direction represented by arrow 43. The pressure medium enters the pump port bore 24 substantially along the axis 42 of the pump port bore, i.e. with a pressure medium flow direction 24 substantially tangential to the outer circumference of the spool 7. Particularly FIG. 3 shows how the pump port bore 24 widens itself to form a pump port or connecting space 25 provided in the housing 6 and surrounding the spool 7. The pump connecting space 25 comprises in substance a crescent-shaped connecting space 32 and an annular channel (annular space) 23. The annular channel 23 is defined by the dotted circle 26.

Spool 7 comprises according to the representation of FIGS. 2 and 3 two spool lands 35 and 36 with a spool neck portion 38 located therebetween. The surface of the spool 7 is referred to by reference numeral 39. Moreover, perpendicular to the connecting surface 18 FIG. 3 shows a first or x-transverse-axis 42 which extends perpendicularly to said connecting surface 18. A second or y-transverse-axis extends parallel to the connecting surface 18 and is referred to by reference numeral 41. The axis of the spool is referred to by reference numeral 37 and is coincident with the longitudinal axis of the valve. The axis 42 of the pump port bore 24 extends substantially parallel to axis 40 and perpendicular to axis 41. The axis 42 of the pump port bore is parallel offset with respect to the axis 40, so that it can be said that the pump port bore 24 is located sideways with respect to the axis 37 of the spool with the consequence that spool 7 will have the tendency to rotate, because the pressure medium is directed against one side of the spool 7. As is shown in FIG. 3, the land 30 is preferably located on axis 41 and therefore splits the annular channel 23 substantially into two halves, specifically those part of the annular channel 23 which extends about 180° between the axis 40. If the land means 30 is arranged in the position shown, the flow resistance of the valve will not be negatively influenced. However, it is also possible to locate the land (formed integrally with the housing) 30 offset with respect to the position shown, for instance, the land 30 could be arranged at a location which is offset to the shown location by 90 degrees in a counter-clockwise direction and up to 60° in a clockwise direction.

As mentioned, the land 30 is preferably formed integrally or unitary together with the housing 6. Particularly, the housing land 30 is provided during the casting operation of the housing 6. Thus, the manufacture of the land does not cause any additional cost.

Figure 4:
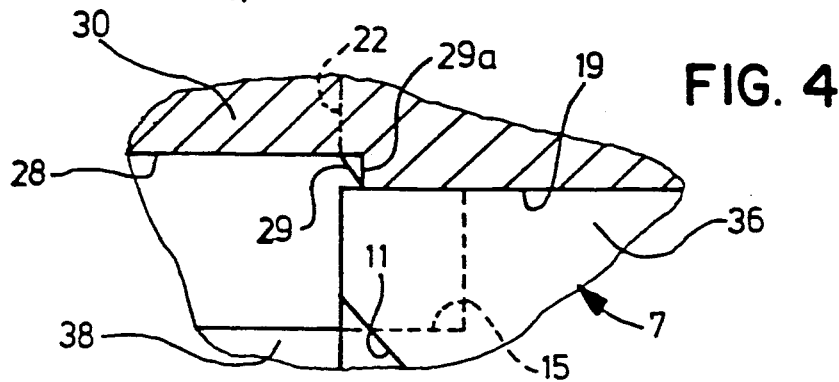
FIG. 4 is a detail of the sectional representation of FIG. 2 in an area of a land formed in the housing also showing that the spool is provided with fine control grooves.

FIG. 4 discloses a detail of FIG. 2 in the area of the land 30. It is to be noted that land 30 does not extend in radial direction all the way to the longitudinal bore 19, but ends at an imagined cylindrical surface, said cylindrical surface having a diameter which is about 1 to 4 mm smaller than the diameter of the longitudinal bore. Due to this "backward" location of the land, the machining of the control edges of the housing is simplified. The end 28 of the land extends at its side under an inclination 29 or under a right angle 29a with respect to the longitudinal bore 19.

Figure 5:
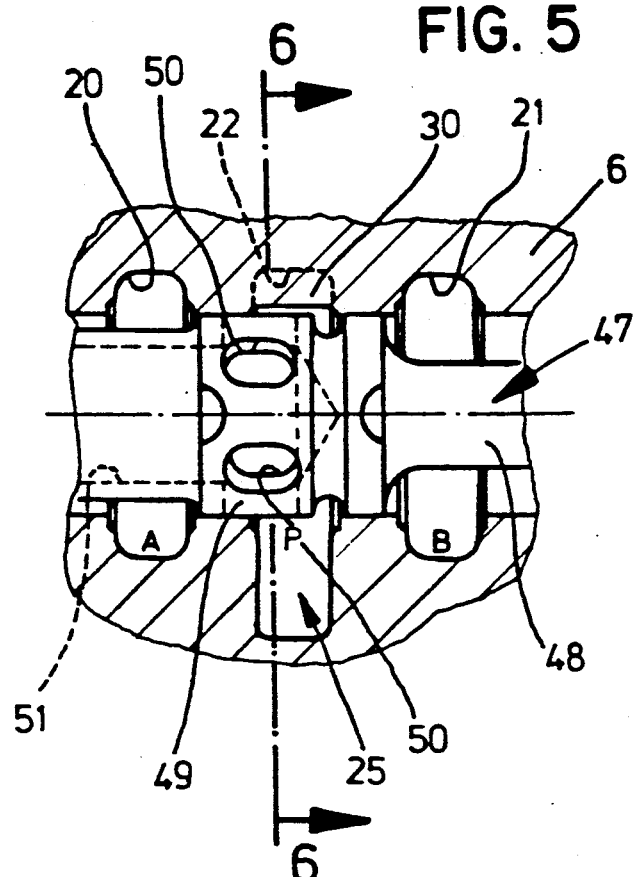
FIG. 5 is a view similar to FIG. 2 with the spool showing radially extending spool bores as well as an elongate bore in the spool.
Figure 6:
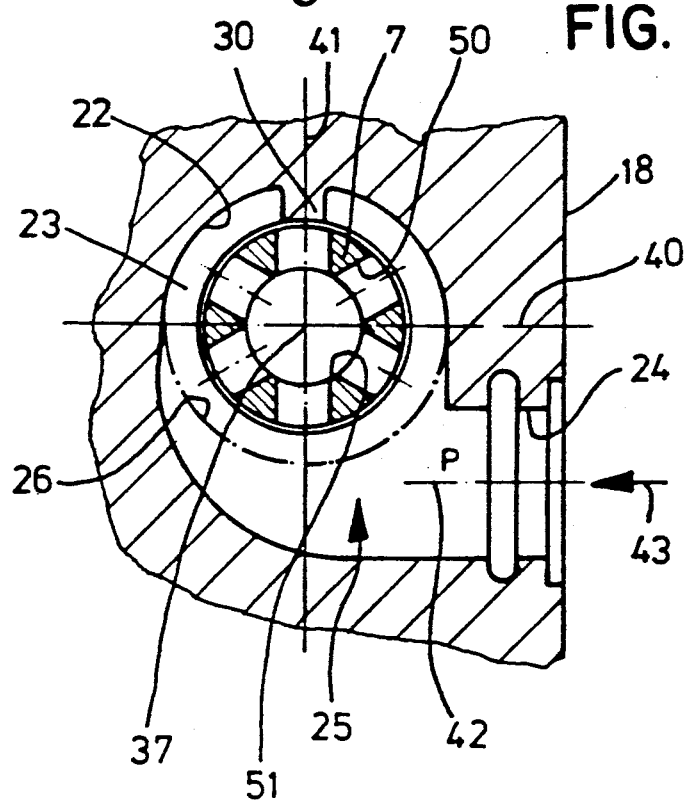
FIG. 6 is a sectional view substantially along line 6—6 in FIG. 5.

FIGS. 5 and 6 show sectional view similar to what is shown in FIGS. 2 and 3. However, in FIGS. 5 and 6 a main spool 47 having a neck portion 48 comprises in the area of a spool land 49 radially extending spool bores 50. The spool bores 50 are connected with a longitudinal bore 51 arranged in said spool 47. With regard to the valve housing 6, there is no difference to be noted with regard to the embodiment of FIGS. 2 and 3, and for that reason in FIGS. 5 and 6 the same reference numerals are used as before. The radially extending bores 50 can cause a rotation of the spool 7 due to the inflow of hydraulic oil in the direction 43. This rotation is blocked by land 30.

Figure 7:
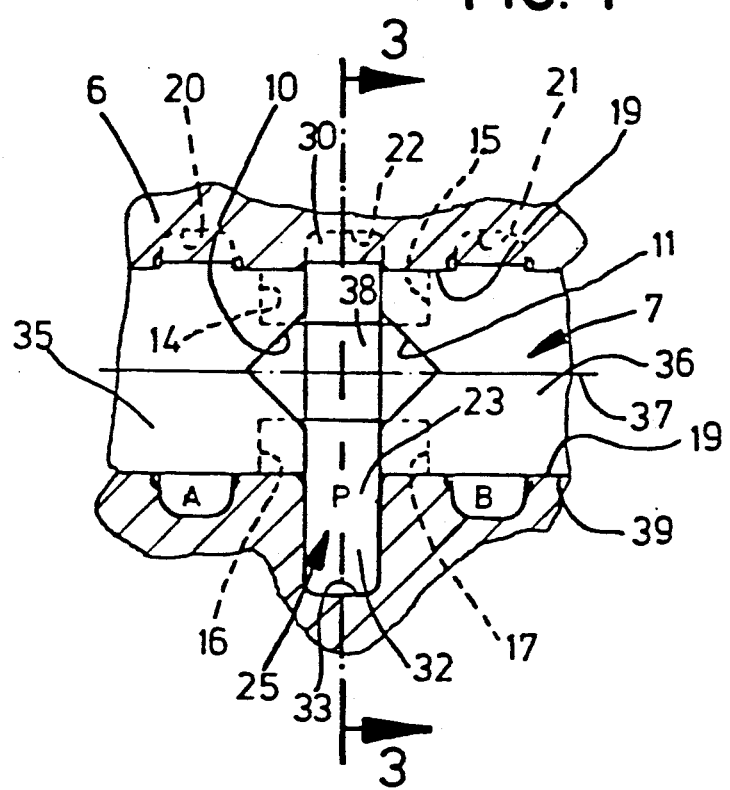
FIG. 7 is a partial cross-sectional view similar to FIG. 2, but now with lands shown not only for the pump channel P but also for the suer channels A and B.

FIG. 7 is a partial cross-sectional view similar to FIG. 2, but now with lands shown not only for the pump channel P but also for user channels A and B. The reference numerals used in FIG. 7 correspond to those used in FIG. 2 and the description of FIG. 2 is applicable thereto.

I claim:
1. A valve comprising;
a valve housing,
a bore in said valve housing,
annular grooves located in said valve housing defining annular channels extending radially outwardly with respect to said bore in said valve housing and adapted to be connected to valve ports arranged in said housing, said annular channels being adapted to direct a flow of pressure medium circumferentially about said bore, a control spool reciprocally mounted within said bore so as to connect and separate said valve ports, and a single land extending into said at least one annular channel substantially radially and transversely to the direction of said circumferential flow of the pressure medium within said annular channel so as to block the rotation of said control spool, said single land being integrally formed with said housing and being offset by 90° with respect to the flow direction of the pressure medium within said annular channel, said single land having a radially inner face which is one of (1) at a radially outer edge of said bore and (2) radially outwardly spaced from said radially outer edge of said bore.

2. The valve of claim 1 wherein said at least one annular channel is associated with a pump port space, and said land is arranged in said annular channel.

3. The valve of claim 2 wherein the pump port space defines an annular space and a crescent shaped connecting space to a pump port bore such that the spool is subjected to a substantially tangential flow of pressure medium, wherein the land located at the housing is offset by substantially 180° with respect to said tangential flow.

4. The valve of claim 1 wherein said land is provided in an annular channel associated with a user connecting chamber.

5. The valve of claim 1 wherein said land projects into said annular channel which surrounds the valve spool in an area of about 180° on a side of the spool opposite to a side towards which fluid flow is directed.

6. The valve of claim 1 wherein the land is formed together with the housing when said housing is cast.

7. The valve of claim 1 wherein the inwardly located end of the land is offset with respect to the longitudinal bore of the housing by approximately 1 to 4 mm.

* * * * *